United States Patent
Alagouda

(10) Patent No.: US 12,023,621 B2
(45) Date of Patent: Jul. 2, 2024

(54) FILTER SYSTEM HAVING A PRIMARY AND A SECONDARY FILTER ELEMENT, SECONDARY FILTER ELEMENT AND METHOD

(71) Applicant: MANN+HUMMEL GmbH, Ludwigsburg (DE)

(72) Inventor: Bharatesh Alagouda, Karnataka (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 371 days.

(21) Appl. No.: 17/562,342

(22) Filed: Dec. 27, 2021

(65) Prior Publication Data
US 2022/0118399 A1 Apr. 21, 2022

Related U.S. Application Data

(63) Continuation of application No. PCT/EP2020/067185, filed on Jun. 19, 2020.

(30) Foreign Application Priority Data

Jun. 27, 2019 (EP) .................................. 19182975

(51) Int. Cl.
*B01D 46/64* (2022.01)
*B01D 46/00* (2022.01)
*B01D 46/24* (2006.01)

(52) U.S. Cl.
CPC ......... *B01D 46/64* (2022.01); *B01D 46/0005* (2013.01); *B01D 46/2414* (2013.01);
(Continued)

(58) Field of Classification Search
CPC ............. B01D 46/64; B01D 2265/026; B01D 46/2414; B01D 46/0005; B01D 2265/06;
(Continued)

(56) References Cited

U.S. PATENT DOCUMENTS 7,828,870 B1 11/2010 Rech et al.
9,346,001 B2 5/2016 Kato et al.
(Continued)

FOREIGN PATENT DOCUMENTS

EP 3470129 A1 4/2019

*Primary Examiner* — Robert Clemente

(57) ABSTRACT

A filter system (100) having a housing (110), a fluid inlet (102) formed in a housing wall (112), a fluid outlet (108) formed in a housing wall (120), a primary filter element (50) and a secondary filter element (10). The secondary filter element (10) is arranged on a stand pipe (150) which is rigidly connected to one of the housing walls (120). The secondary filter element (10) comprises a filter medium (16) forming a body (36) having at least one longitudinal seam (18) along a longitudinal axis (L). The filter body (36) has a first edge (13) at one region (12) which is curved in an initial unwound state of the filter medium (16) and straight in a final wound state of the filter medium (16) forming the filter body (36) and a second edge (15) at the opposite region (14) of the filter body (36) with respect to the longitudinal axis (L) which is straight in an initial unwound state of the filter medium (16) and curved in a final wound state of the filter medium (16) forming the filter body (36). A method of manufacturing is also disclosed.

18 Claims, 7 Drawing Sheets

(52) U.S. Cl.
CPC .... *B01D 2265/026* (2013.01); *B01D 2265/06* (2013.01); *B01D 2275/206* (2013.01)

(58) Field of Classification Search
CPC ......... B01D 2265/021; F02M 35/0214; F02M 35/0216
See application file for complete search history.

(56) References Cited

U.S. PATENT DOCUMENTS

| | | |
|---|---|---|
| 10,413,855 B2 | 9/2019 | Nelson et al. |
| 2004/0031748 A1 | 2/2004 | Kochert et al. |
| 2009/0100813 A1* | 4/2009 | Iddings ................. B01D 46/64 55/498 |
| 2012/0067017 A1 | 3/2012 | Baseotto et al. |
| 2014/0144111 A1 | 5/2014 | Campbell et al. |
| 2016/0296868 A1 | 10/2016 | Stark et al. |
| 2016/0296869 A1 | 10/2016 | Stark et al. |
| 2018/0036667 A1 | 2/2018 | Neef et al. |
| 2019/0015770 A1 | 1/2019 | Scott et al. |
| 2019/0299143 A1 | 10/2019 | Decoster et al. |

\* cited by examiner

FILTER SYSTEM HAVING A PRIMARY AND A SECONDARY FILTER ELEMENT, SECONDARY FILTER ELEMENT AND METHOD

CROSS REFERENCE TO RELATED APPLICATIONS

This application is a continuation application of international application No. PCT/EP2020/067185 having an international filing date of 19 Jun. 2020 and designating the United States, the international application claiming a priority date of 27 Jun. 2019 based on prior filed EPO patent application No. EP 19182975.3, the entire contents of the aforesaid international application and the aforesaid EPO patent application being incorporated herein by reference to the fullest extent permitted by the law.

TECHNICAL FIELD

The invention relates to a filter system having a primary and a secondary filter element and a secondary filter element for such a filter system, in particular for an air filter system of an internal combustion engine. The invention further relates to a method of manufacturing a secondary filter element.

BACKGROUND

It is known to use air filters in order to control combustion intake air for internal combustion engines in passenger vehicles, commercial vehicles, work machines, agricultural vehicles, but also stationary generators and the like. Such air filters generally comprise a housing, an air inlet, and an air outlet, with a removable and replaceable main or primary filter element disposed within the housing. The housing often includes a maintenance cover for access to the filter element inside the housing during maintenance. For this purpose, the filter element can be removed and either replaced by a new filter element, overtaken and reused, or replaced by a previously used, but overtaken filter element.

The filter elements of air filters are usually replaced after a certain operating time. Depending on the dust load on the filter element during usage, the service life of a filter can be several days, for example when used in construction machines, up to several months in a less dusty environment.

In particular in the case of frequent exchanges of filter elements, reliable and process-proof sealing of the filter element in a housing is important. The sealing should be temperature resistant and vibration tested. The sealing of the filter element must also be ensured on systems or devices which are exposed to strong vibrations. At the same time, however, the filter element itself should preferably not have any metallic elements, so that it can be disposed of thermally without problems. In order to protect the clean side of an air cleaner system of an internal combustion engine against penetrating dirt particles when replacing the main filter element, a so-called "secondary filter element" is used, which remains in the filter housing during replacement of the primary filter element. The secondary filter element is usually located on the clean side of the filter element, for example inside the primary filter element, and is connected to the housing of the filter system. The secondary filter element itself also has a filter medium which keeps residual dirt particles away from the filter outlet in the air stream.

Optionally, the secondary filter element itself can be exchanged as it can be loaded with dust particles. The lifetime of the secondary filter element, however, is much longer than the lifetime of the primary filter element.

U.S. Pat. No. 8,480,778 B2 discloses an air filter system in which a secondary filter element is disclosed which consists of a filter medium configured as a hollow cylinder which is closed at one side by a closed end cap and is open at the other end. With the open end it can be slipped over a support tube connected to the filter housing, thus protecting the outlet of the filter system against dirt particles. The primary filter element rests on the free end of the supporting tube and thus on the end cap of the secondary filter element. The primary filter element is mounted on the secondary filter element.

SUMMARY OF THE INVENTION

It is an object of the invention to provide a filter system for accommodating a cost efficient secondary filter element.

It is a further object of the invention to provide a secondary filter element for such a filter system.

It is a further object of the invention to provide a housing wall for such a filter system.

The aforementioned object is achieved according to one aspect of the invention by a filter system comprising a housing, a fluid inlet formed in a housing wall, a fluid outlet formed in a housing wall, a primary filter element and a secondary filter element, both being accommodated in the housing. The secondary filter element is arranged downstream the primary filter element on a preferably frustoconical stand pipe, the stand pipe being rigidly connected to one of the housing walls, the inside of the stand pipe being in fluid connection with the fluid outlet. The secondary filter element comprises a filter medium forming a preferably frustoconical filter body having at least one longitudinal seam along a longitudinal axis. The filter body of the secondary filter element has a first edge at one region which is curved in an initial, especially flat, unwound state of the filter medium and, when viewed perpendicular to the longitudinal axis of the secondary filter element, straight in a final wound state where the filter medium forms the filter body and a second edge at the opposite region of the filter body with respect to the longitudinal axis which is straight in an initial, especially flat, unwound state of the filter medium and, when viewed perpendicular to the longitudinal axis, curved in a final wound state where the filter medium forms the filter body, as well, according to another aspect of the invention by a secondary filter element for such a filter system and, according to another aspect of the invention, by a housing wall for an inventive filter system.

Advantageous embodiments and advantages of the invention are described in the further claims, the description and the drawings.

According to a first aspect of the invention, a filter system is proposed comprising a housing, a fluid inlet formed in a housing wall, a fluid outlet formed in a housing wall, a primary filter element and a secondary filter element, both being accommodated in the housing. The secondary filter element is arranged downstream the primary filter element on a stand pipe, the stand pipe being rigidly connected to one of the housing walls, the inside of the stand pipe being in fluid connection with the fluid outlet. The secondary filter element comprises a filter medium forming a body having at least one longitudinal seam along a longitudinal axis. The filter body of the secondary filter element has a first edge at one region which is curved in an initial unwound state of the filter medium and, when viewed perpendicular to the longitudinal axis, straight in a final wound state where the filter medium forms the filter body and a second edge at the opposite region of the filter body with respect to the longitudinal axis which is straight in an initial unwound state of the filter medium and, when viewed perpendicular to the longitudinal axis, curved in a final wound state where the filter medium forms the filter body.

The special shape of the cut of the unwound filter medium with a straight edge at one side and a curved edge on the opposite side, which establish the upper and lower end of the filter body in its final wound state realizes material savings and creates a specific non-circular sealing interface. Besides the cost efficient manufacturing of the secondary filter element, the specific shape of the filter body allows for a specific sealing structure at the stand pipe to which the secondary filter element is mounted in the filter system. The secondary filter element can be arranged in a unique rotational position on the stand pipe so that the position of the longitudinal seam of the secondary filter element has a well-defined rotational position in the housing.

Preferably, the cut of the filter medium can be described as having a generally trapezoidal shape. The trapezoidal shape preferably is based on an isosceles trapezoid having a center line of symmetry, two parallel bases and two oblique legs or sides, wherein the longer base defines the straight edge and wherein the shorter base is modified by cutting a circular segment off the trapezoid, the circle having a center on the center line of symmetry of the trapezoid and the circle line intersecting the shorter base at both ends, creating a concave cut line defining the first curved edge. To create a frustoconical filter body, the legs or sides of the cut can be connected with a seam, for example by gluing, welding, sewing or the like.

The specific shape of the edge of the secondary filter element and the sealing structure on the stand pipe enable a defined position of the longitudinal seam of the filter medium of the secondary filter element. As result a flow-disturbing influence of the longitudinal seam on the flow characteristics can be reduced or even eliminated. Additionally a reproducible position of the seam or seams with respect to a mass flow sensor can be achieved in case the secondary filter element is exchanged.

Advantageously, by connecting the stand pipe rigidly with the bottom wall of the housing, the positions of the longitudinal struts of the stand pipe are known. By positioning the secondary filter element in a distinct rotational orientation with respect to one or more struts of the stand pipe, disturbances of the flow characteristic due to one or more longitudinal seams of the filter medium of the secondary filter element can be reduced or eliminated.

It is of advantage to position the secondary filter element on the stand pipe in a similar defined rotational position with respect to one or more struts of the stand pipe. As a result, the position of the seam or seams, for example, of the secondary filter element on the stand pipe is known, too and can be reproduced when the secondary filter element is exchanged. Preferably, the secondary filter element may have a longitudinal seam. The seam can be positioned radially in front of one particular strut or, alternatively, between two longitudinal struts. In a preferred air filter system for a combustion engine this allows to position the longitudinal struts of the stand pipe and the primary filter element with respect to a mass flow sensor in a way that the flow characteristics of the fluid, i.e. air, is known in the region of the mass flow sensor and the measurements of the mass flow sensor are accurate.

Moreover, a further advantage of such a filter system is the safe and stable assembly of the primary filter element and of the secondary filter element, as well as a very economical interchangeability of the primary filter element and, if appropriate, of the secondary filter element, in the event of maintenance.

According to a favorable embodiment, a sealing structure may be arranged at the stand pipe the contour of which being complementary to the contour of the second edge of the secondary filter element. The sealing structure and the second edge cooperate as mutual self-positioning elements which allows to position the secondary filter element in a defined rotational position in the housing.

According to a favorable embodiment, the sealing structure may comprise a pocket for accommodating the secondary filter element, the pocket having a bottom following the contour of the sealing structure. The pocket receives the respective end of the filter body. Due to the unique contour of the region of the filter body comprising the second edge and the sealing structure a reliable positioning of the secondary filter element is provided.

According to a favorable embodiment, the contour of the sealing structure may comprise a maximum point and a minimum point at its outer surface, wherein a height of the minimum point is lower than a depth of the pocket at the maximum point in relation to the longitudinal axis, preferably wherein a height of the minimum point has a shorter extension along the longitudinal axis measured from a base line than an extension along the longitudinal axis from the base line to the bottom of the pocket at the maximum point. Mounting the secondary filter element to the sealing structure in its proper position is facilitated.

According to a favorable embodiment, the region of the secondary filter element comprising the second edge of the filter body may be arranged close to an interface between the one of the housing walls and the stand pipe. In particular, the secondary filter element may have a conical shape, and the second edge may be located at the broad basis of the conus form, thus facilitating mounting of the secondary filter element.

According to a favorable embodiment, the secondary filter element may comprise an end cap at its top region and the secondary filter element and the stand pipe may be mutually connected at one of their top regions by connection elements. This feature ensures the stable positioning of the secondary filter element.

According to a favorable embodiment, the primary filter element and the one of the housing walls accommodating the stand pipe and the bottom portion of the primary filter element may be configured with mutual self-positioning elements to arrange the primary filter element on the one of the housing walls accommodating the stand pipe in a defined rotational position with respect to one or more struts of the stand pipe. In particular the mutual self-positioning elements may comprise a radially extending protrusion and a guiding surface, the radially extending protrusion being configured to glide along the guiding surface on a relative rotational movement of the primary filter element and the one of the housing wall about a common rotational axis. In addition to the secondary filter element, the primary filter element can be arranged in a rotational position which is favourable for the fluid flow through the filter system. Advantageously, the radially extending protrusion may be arranged on the outside of an open end cap of the primary filter element and the guiding surface may be provided on the inside of the one of the housing walls, surrounding the stand pipe, and/or wherein the guiding surface includes a notch for accommodating the radially extending protrusion in its locked position. The mutual self-positioning elements can be arranged in a space saving manner. For instance, the radially extending protrusion may be arranged at the outer surface of a ring embedded in the end cap of the primary filter element.

According to a favorable embodiment, the secondary filter element and the stand pipe may be configured with mutual self-positioning elements to arrange the secondary filter element on the stand pipe in a defined rotational position with respect to one or more struts of the stand pipe. The mutual self-positioning elements may comprise a guiding surface and a projection element, wherein the guiding surface is intended to guide the projection element from an initial position to a final position where the secondary filter element is in its defined rotational position with respect to the one or more struts of the stand pipe. Appropriate pairs of mutual self-positioning elements can be chosen. Additionally or alternatively, the mutual self-positioning elements may comprise a contour arranged at an exterior surface of one of the stand pipe and the secondary filter element and a counter contour at an interior surface of the other one of the stand pipe and the secondary filter element. Favorably, a polygonal contour on the stand pipe can be used for mounting the stand pipe to the bottom wall of the housing in a position oriented manner. Dual use can be made of such a contour for aligning the secondary filter element on the stand pipe, too, when an appropriate counter contour is provided on the secondary filter element.

According to a further aspect of the invention a secondary filter element for the inventive filter system is proposed, comprising a filter medium forming a body with at least one longitudinal seam, in particular weld seam, along a longitudinal axis and an end cap at its top region, wherein the filter body has a first edge at one region which is curved in an initial unwound state of the filter medium and straight in a final wound state of the filter medium forming the filter body and a second edge at the opposite region of the filter body with respect to the longitudinal axis which is straight in an initial unwound state of the filter medium and curved in a final wound state of the filter medium forming the filter body.

The special cut of the filter medium of the secondary filter element allows for a reliable and reproducible mounting of the secondary filter element into a housing.

According to a favorable embodiment of the secondary filter element, the end cap may be provided with one or more connection elements which are intended to connect the secondary filter element to a stand pipe of the filter system, and/or the end cap may be provided with a self-positioning element to arrange the secondary filter element on the stand pipe of the filter system in a defined rotational position with respect to one or more struts of the stand pipe of the filter system. The secondary filter element can be arranged stable and reliably on the stand pipe in the first case and can be mounted in a defined rotational position in the housing allowing for reducing or eliminating disturbances of the fluid flow caused by the longitudinal seam of the secondary filter element.

According to a favorable embodiment of the secondary filter element, the end cap may have a pot-like shape and the self-positioning element extends into the interior of the secondary filter medium. Favorably, the self-positioning element can be guided by the end cap, thus facilitating mounting of the secondary filter element.

According to a favorable embodiment of the secondary filter element, the end cap may be provided with a projection element extending in axial direction. Favorably, the axial projection element can be guided by the end cap, thus facilitating mounting of the secondary filter element.

According to a further aspect of the invention a method of manufacturing a filter element is proposed, comprising the first step of providing a cut of filter medium, the cut of the filter medium having a modified trapezoidal shape based on an isosceles trapezoid having a center line of symmetry, two parallel bases and two unmodified oblique legs or sides, wherein the unmodified longer base defines a straight edge and wherein the shorter base is modified by cutting a circular segment off the trapezoid, the circle having a center on the center line of symmetry of the trapezoid and the circle line intersecting the shorter base at both ends, creating a concave cut line defining a first curved, especially concave edge. To create a frustoconical filter body, the legs or sides of the cut are connected in a second step, for example with a seam, for example by gluing, welding, sewing or the like.

Optionally, at least one end cap can be provided at at least one axial end of the frustoconical filter body.

Advantageously, the inventive filter system and secondary filter element can be used as an air filter, in particular as an air filter of an internal combustion engine. The safe operation of internal combustion engines is also based on safe and favorable filtering of the intake air for combustion operation, in particular with an undisturbed flow characteristic of the air at the mass flow sensor. The described filter system represents an economic and reliable possibility for this purpose. The use of the filter system as a particle filter, in particular as a particle filter of an internal combustion engine, is also advantageous. Again, the secure assembly and economic interchangeability of the described filter elements is of advantage. Conveniently, the secondary filter element may remain in the housing when the primary filter element is changed. This ensures that the clean side of the filter system is also effectively protected against penetrating dirt particles during maintenance of the filter system.

According to a further aspect of the invention a housing wall for the inventive filter system is proposed, the filter system comprising a housing providing a fluid inlet and a fluid outlet formed in the housing wall, and accommodating a primary filter element and a secondary filter element having a filter body, wherein a stand pipe for a secondary filter element is rigidly connected to the housing wall, the inside of the stand pipe being in fluid connection with the fluid outlet, and comprising a sealing structure arranged at the stand pipe the contour of which being complementary to a contour of an edge of the secondary filter element, wherein the contour of the edge is straight in an initial unwound state of the filter medium and curved in a final wound state of the filter medium forming of the filter body.

Advantageously, the housing wall is providing a specific sealing interface for the inventive secondary filter element, thus enabling mounting of the filter element in a defined position.

According to a favorable embodiment of the housing wall, the contour of the sealing structure comprises a maximum point and a minimum point, wherein a height of the minimum point is lower than a depth of the pocket at the maximum point in relation to the longitudinal axis, preferably wherein a height of the minimum point has a shorter extension along the longitudinal axis measured from a base line than an extension along the longitudinal axis from the base line to the bottom of the pocket at the maximum point.

Mounting the secondary filter element to the sealing structure in its proper position is facilitated.

According to a favorable embodiment of the housing wall, a self-positioning element may be arranged around the stand pipe intended to cooperate with a corresponding self-positioning element arranged at the primary filter element and/or the self-positioning element may be configured as a guiding surface surrounding the stand pipe. In addition to the advantageous reproducible positioning of the secondary filter element, the primary filter element can be positioned in a defined rotational position, too.

It is to be understood that the invention can be combined with one of more of the features disclosed in the applications with the title "Filter system having a primary and a secondary filter element and secondary filter element for such a filter system" all filed by the applicant together with this patent application at the same day.

BRIEF DESCRIPTION OF THE DRAWINGS

Further advantages result from the following drawing description. Embodiments of the invention are shown in the drawings. The drawings, the description, and the claims contain numerous features in combination. The person skilled in the art will expediently also consider the features individually and combine them into sensible further combinations. For example.

DETAILED DESCRIPTION

Figure 1:
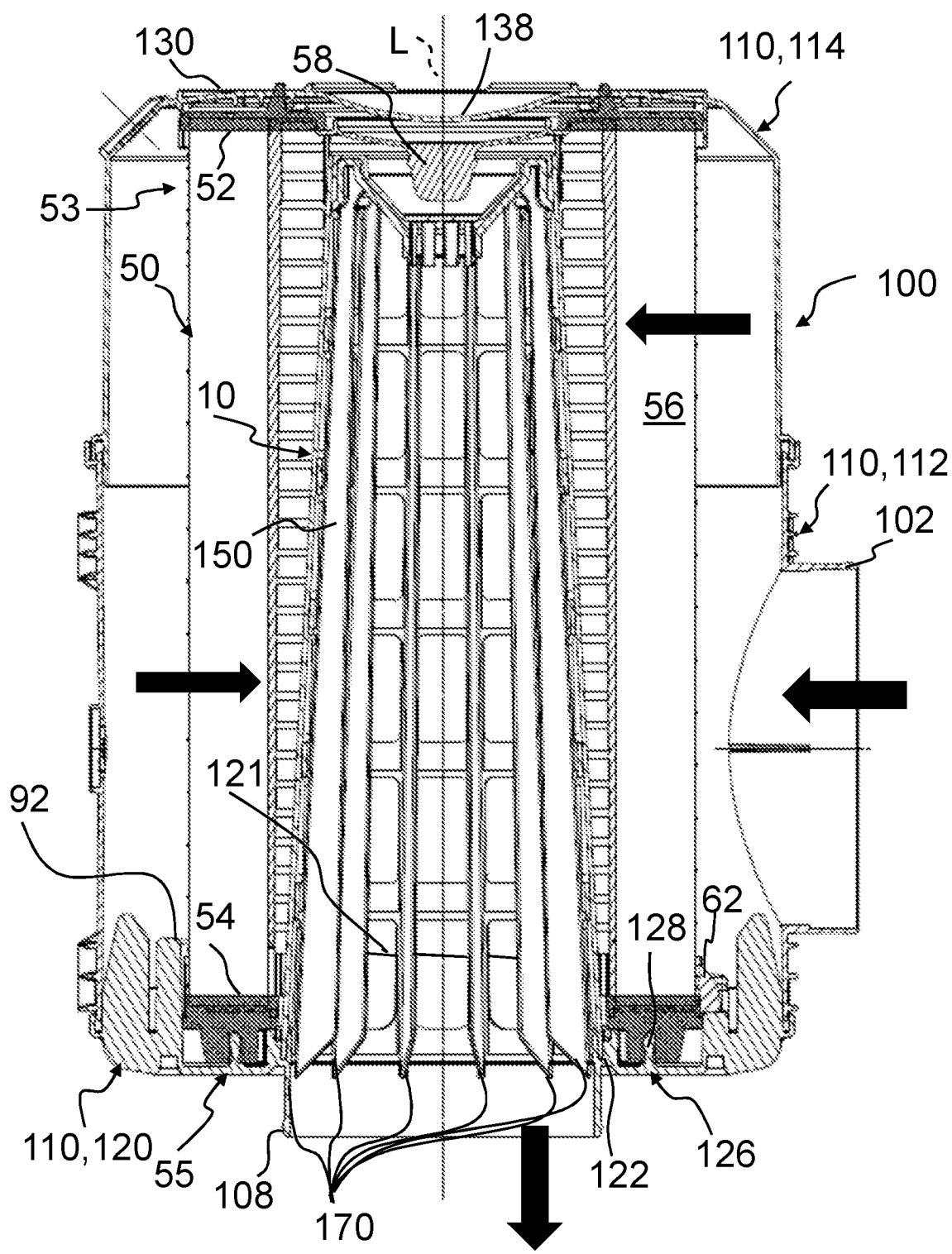
FIG. 1 shows a longitudinal cut view of a filter system according to an embodiment of the invention.

The figures show merely examples and are not intended to be limiting. Similar or equal elements are referred to with same reference numerals in the Figures.

Figure 2:
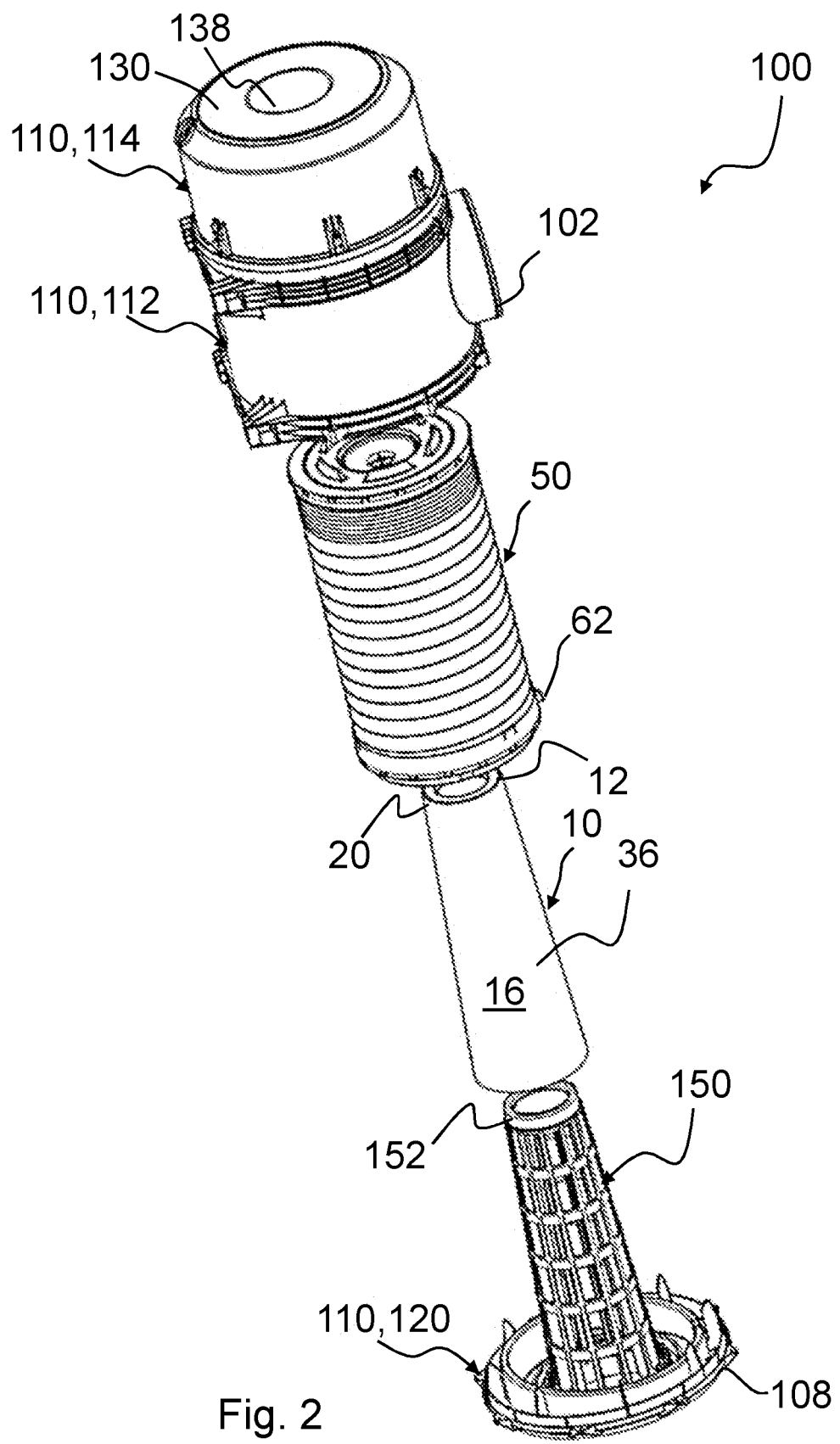
FIG. 2 shows the filter system of FIG. 1 in an exploded view.

FIG. 1 shows a longitudinal cut view of a filter system 100 according to an embodiment of the invention. FIG. 2 shows the filter system 100 of FIG. 1 in an exploded view.

The filter system 100 comprises a housing 110, a fluid inlet 102 formed in a housing wall 112, a fluid outlet 108 formed in a bottom housing wall 120. In this embodiment, the housing 110 may consist of three segments, the bottom housing wall 120, the intermediate ring-shaped housing wall 112 with the fluid inlet 102 and a cover part 114. The segments are connected to each other by, e.g., clamps, screws or the like. A hollow cylindrical primary filter element 50 is accommodated in the housing 110. For removing the primary filter element 50 for maintenance or exchange the housing walls 112, 114 can be removed from the bottom housing wall 120 together in one piece or only the cover part 114 is removed.

The body of the primary filter element 50 is made of a filter medium 56 which may be pleated, for instance. The primary filter element 50 is covered at both ends by ring shaped first and second end caps 52, 54, which are made, for example, from polyurethane which is well known in the prior art. Sealing structures and supporting ribs are arranged at the exterior sides of the first end cap 42 and the second end cap 54. The primary filter element 50 is clamped between the bottom housing wall 120 and the cover housing wall 114 in a sealing tight manner so that a fluid has to pass through the primary filter element 50 in a radial direction, which is indicated by bold arrows in FIG. 1. The second end cap 54 of the primary filter element 50 is configured to have a feedthrough for the stand pipe 150 and is accommodated in the bottom housing wall 120 which is provided with a groove 126. For radial fixation of the primary filter element 50, a ring shaped projection 128 is arranged in the groove 126.

In its front face 130, the cover part 114 is provided with a recess 138 which extends into the interior of the housing 110.

Inside the primary filter element 50, a secondary filter element 10 is arranged. The primary and secondary filter elements 50, 10 are arranged concentrically about an axis extending in a longitudinal direction L. The secondary filter element 10 is arranged downstream the primary filter element 50 so that fluid has to pass through the secondary filter element 10 on its way to the fluid outlet 108. The secondary filter element 10 is arranged on a stand pipe 150 which is rigidly connected to the bottom housing wall 120. The lower part of the stand pipe 150 merges with the fluid outlet 108 of the bottom housing wall 120. The secondary filter element 10 comprises a filter medium 16 forming a body 36 with at least one weld seam 18 along the longitudinal direction L.

Optionally, the secondary filter element 10 comprises a closed end cap 20 at its top region 12, wherein the secondary filter element 10 and the stand pipe 150 are mutually connected at their top regions 12, 152 by connection elements. The open ended side at the bottom region 14 of the secondary filter element 10 is accommodated in a circular groove 122 in the bottom wall 120.

The first end cap 52 at the top region of the primary filter element 50 is provided with a protrusion element 58 extending in axial direction towards the top region 12 of the secondary filter element 10.

The bottom region 55 of the primary filter element 50 and the housing wall 120 accommodating the stand pipe 150 are configured with mutual self-positioning elements 62, 92 to arrange the primary filter element 50 on the housing wall 120 in a defined rotational position with respect to one or more struts 170 of the stand pipe 150. The struts 170 are arranged about the longitudinal axis L and are pointing to the interior of the stand pipe 150.

In particular, a radially extending protrusion 64 is arranged at the bottom part 55 of the primary filter element 50 as self-positioning element 62. A guiding surface 94 is arranged around the stand pipe 150 as self-positioning element 92. The guiding surface 94 is formed as a ramp which has a maximum region with a maximum height in relation to the longitudinal axis L and a minimum region with a minimum height in relation to the longitudinal axis L at the opposite side of the stand pipe 150. The radially extending protrusion 64 can glide on the guiding surface 94 from the maximum region to the minimum region when the primary filter element 50 and/or the bottom housing wall 120 are rotated about the longitudinal axis L. A notch 96 is arranged in the minimum region in which the radially extending protrusion 64 of the primary filter element 50 can snap into place.

Figure 3:
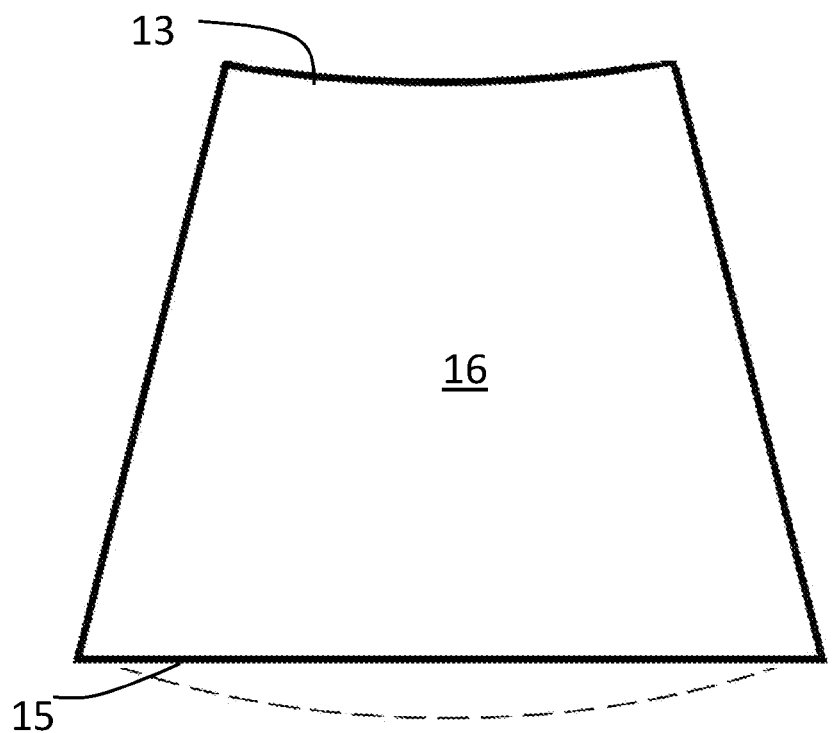
FIG. 3 shows a cut of a filter medium in an initial unwound state exhibiting a first edge which is curved in this state and a second edge which is straight, indicating a saved area of filter medium.
Figure 4:
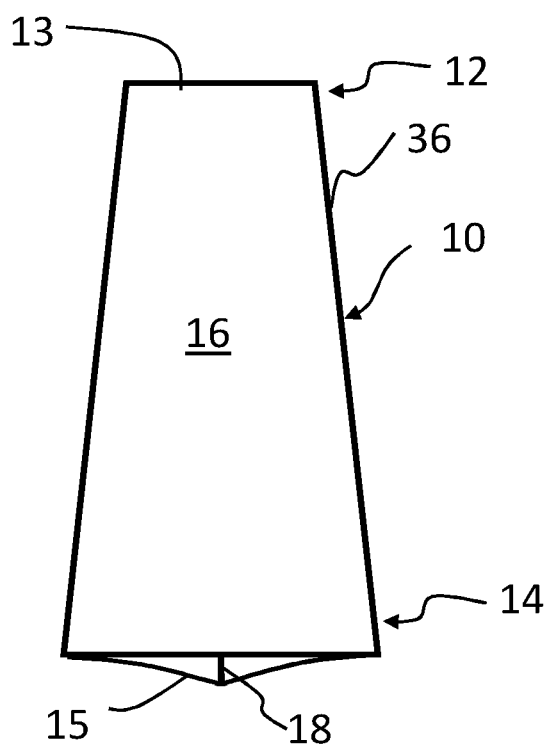
FIG. 4 the filter medium of FIG. 3 in a final wound state forming a conical filter body exhibiting the first edge being straight and the second edge being curved.

FIGS. 3 and 4 show a filter medium 16 and a conical secondary filter element 10 made from the filter medium 16 according to an example embodiment of the invention. FIG. 3 shows a first embodiment of a cut of a filter medium 16 for secondary filter element 10 in an initial unwound state exhibiting a first edge 13 which is curved in this state and a second edge 15 which is straight.

The curved dashed line below the straight edge 15 indicates a contour of a typical cut of a filter medium 16 from which a conical filter body is formed. The area enclosed by the straight edge 15 in the unwound state of the filter medium 16 and the dashed line shows the area of saved material of filter medium 16 by using a cut with a straight edge 15 for a filter medium 16.

The advantageous cut of the filter medium 16 in FIG. 3 can be described as having a generally trapezoidal shape. The trapezoidal shape preferably is based on an isosceles trapezoid having a center line of symmetry (not shown), two bases 13, 15 and two oblique legs or sides, wherein the longer base defines the straight edge 15 and wherein the shorter base is modified by cutting a circular segment off the trapezoid, the circle having a center on the center line of symmetry of the trapezoid and the circle line intersecting the shorter base at both ends, the concave cut line defining the first edge 13. To create a frustoconical filter body 36, the sides of the cut are connected with a seam 18, for example by gluing, welding, sewing or the like.

FIG. 4 shows the filter medium 16 exhibiting the cut shown in FIG. 3 in a final wound state forming the conical filter body 36 of the filter element 10 exhibiting the first edge 13 at the top region 12 being straight and the second edge 15 at the bottom region 14 being curved. The sides of the cut are closed by means of a welded seam 18, for instance. As can be seen, when the filter medium is wound to form a tree dimensional filter body 36, in this example a conical filter body 36, the edge 15 at the region 14 of the filter body 36 of the filter element 10 is curved. This cut results in the secondary filter element 10 having a preferred orientation which can be used for a specific rotational orientation of the secondary filter element 10 in a housing of a filter system.

Figure 5:
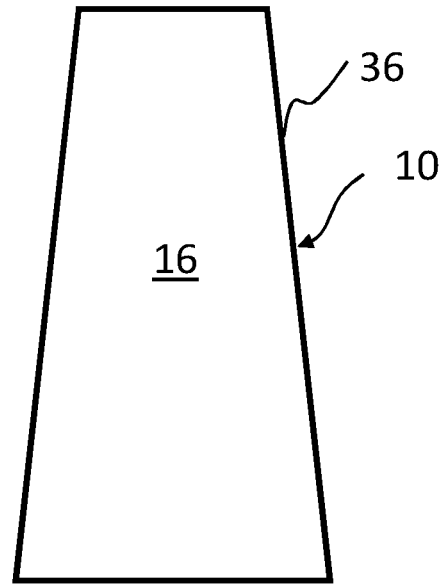
FIG. 5 shows a filter medium wound to a standard conical filter body with upper and lower straight edges.

FIG. 5 shows a conventional filter medium 16 wound to a standard conical filter body 36 with upper and lower straight edges of the filter body 36, while in the unwound state the cut exhibits curved edges at both ends of the filter medium 16.

Figure 6:
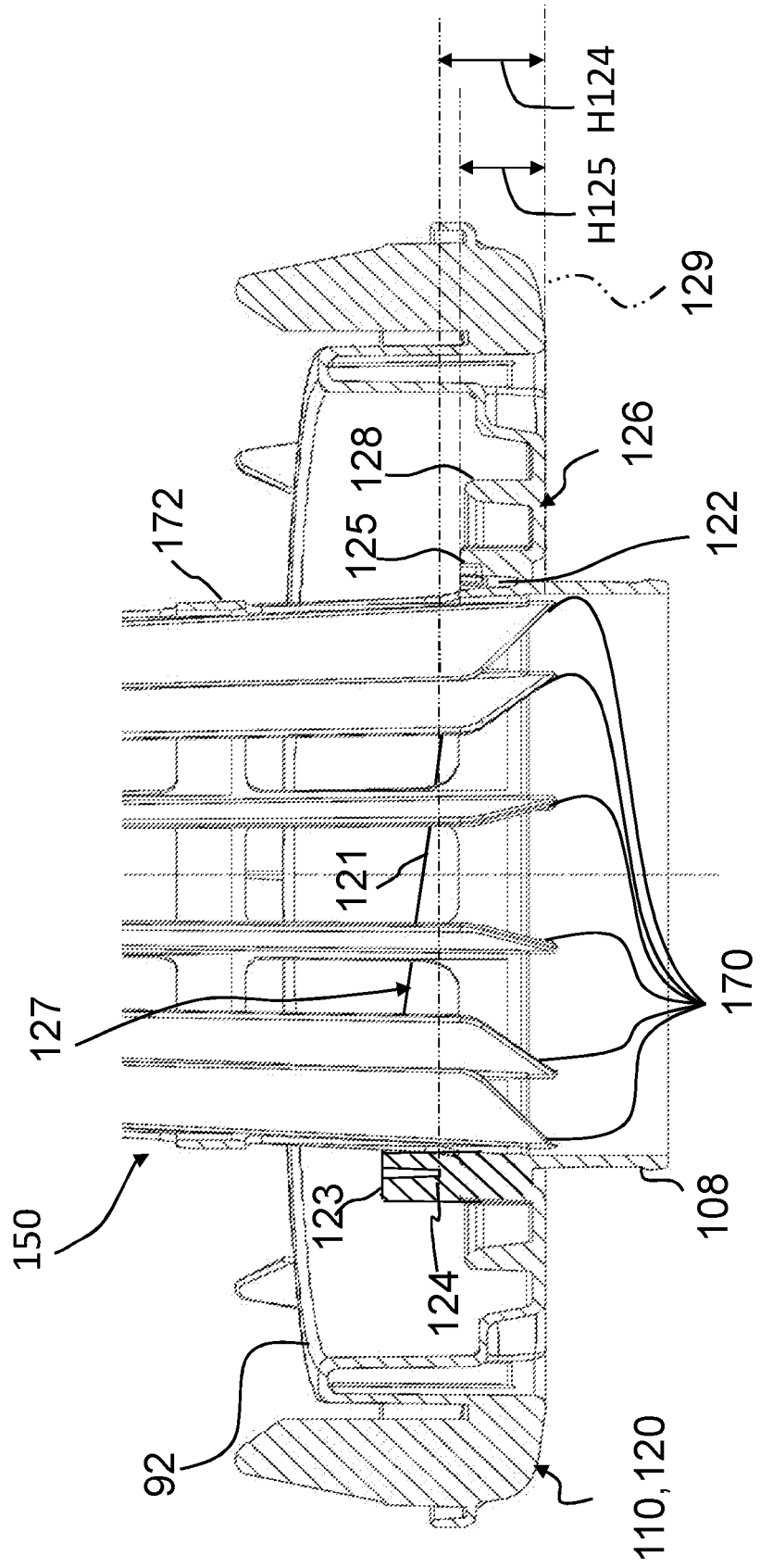
FIG. 6 shows a detail of a cut view of a housing wall comprising a stand pipe rigidly attached to, the stand pipe comprising a sealing structure for a secondary filter element according to an embodiment of the invention.

FIG. 6 shows a detail of a cut view of a housing wall 120, for instance the bottom wall 120 of a housing 110, comprising a stand pipe 150 rigidly attached to, the stand pipe 150 comprising a sealing structure 127 for accommodating a secondary filter element 10 according to an embodiment of the invention.

The lattice-like body of the stand pipe 150 is conically shaped and composed of longitudinal struts 170 and circumferential struts 172. A circular groove 122 is provided for receiving the open-ended side at the bottom region 14 of the secondary filter element 10 (FIG. 4) in the housing wall 120. The open-ended side at the bottom region 14 of the secondary filter element 10 as shown in FIG. 4 comprises an edge 15 which has a curved contour, whereas the opposite side of the secondary filter element 10 is provided with a straight edge 13 at its top region 12.

The primary filter element 50 is intended to be clamped between the bottom housing wall 120 and a cover housing wall 114 (FIG. 1) in a sealing tight manner so that a fluid has to pass through the primary filter element 50 in a radial direction, the second end cap 54 of the primary filter element 50 is configured to have a feedthrough for the stand pipe 150 and is accommodated in a groove 126 of the bottom housing wall 120. For radial fixation of the primary filter element 50, a ring shaped projection 128 is arranged in the groove 126.

A sealing structure 127 for sealing the secondary filter element 10 is arranged about the stand pipe 150 close to the interface between stand pipe 150 and housing wall 120. The sealing structure comprises a pocket 122 for accommodating the secondary filter element 10. The pocket 121 comprises a bottom 124 following the contour 121 of the sealing structure 127. The contour 121 of the sealing structure 127 declines from a maximum point 123 at one side of the stand pipe 150 to a minimum point 125 at the opposite side of the stand pipe 150 in a continuous manner.

A height H125 of the minimum point 125 is lower than the bottom 124 of the pocket 122 at the maximum point 123 in relation to the longitudinal axis, i.e. the height H125 of the minimum point 125 has a shorter extension along the longitudinal axis L measured from a base line 129 than an extension along the longitudinal axis L from the base line 129 to the bottom 124 of the pocket 122 at the maximum point 123. The base line 129 is in particular arranged perpendicular to the longitudinal axis L.

This decline of the contour of the sealing structure 127 causes a big enough height difference between the maximum point 123 and the minimum point 125 so that the secondary filter element 10 can be inserted in the pocket 122 with its edge 15 in a suitably oriented and non-interchangeable manner.

Figure 7:
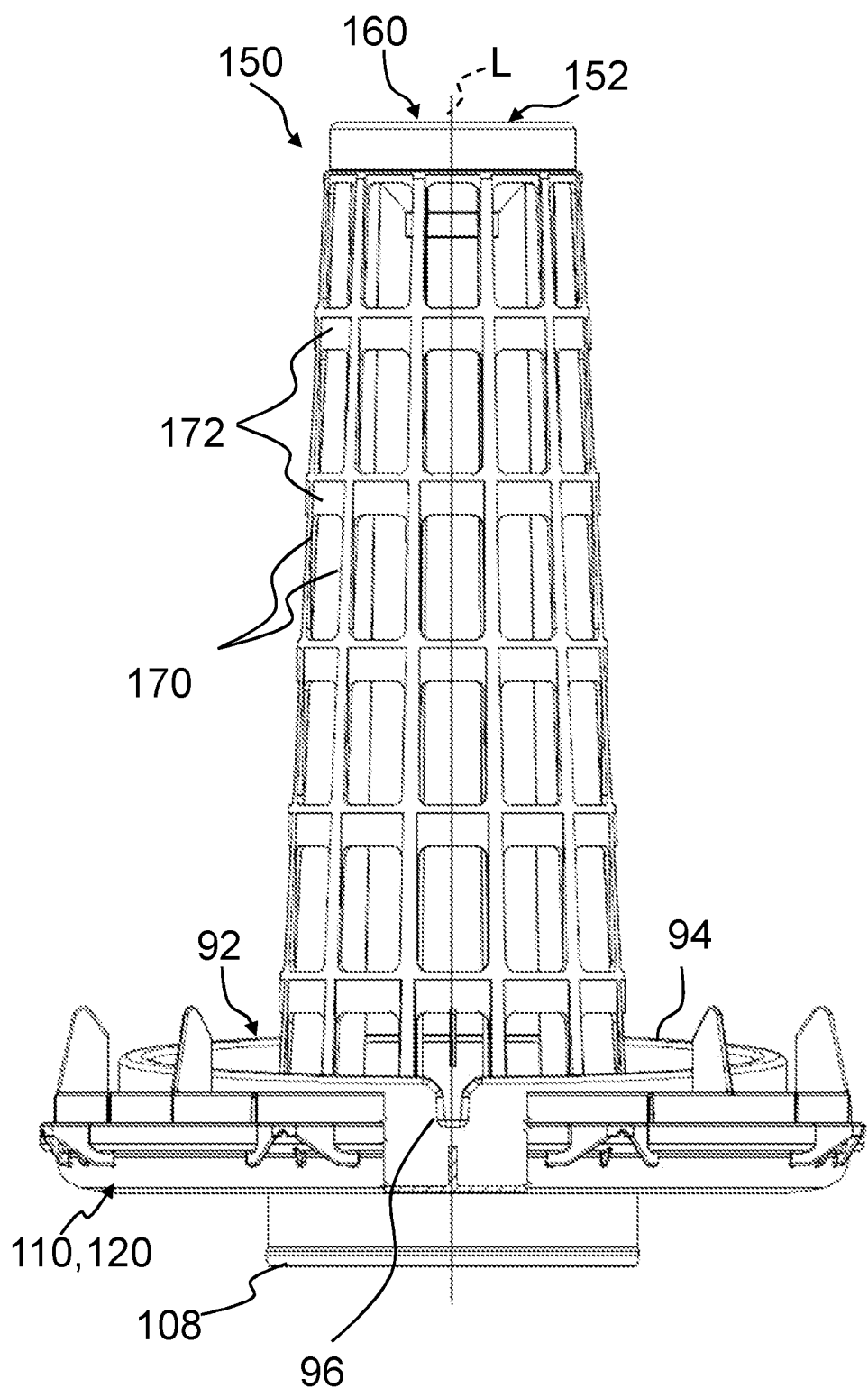
FIG. 7 shows a bottom wall of a housing of a filter system with a stand pipe attached to the bottom wall.
Figure 8:
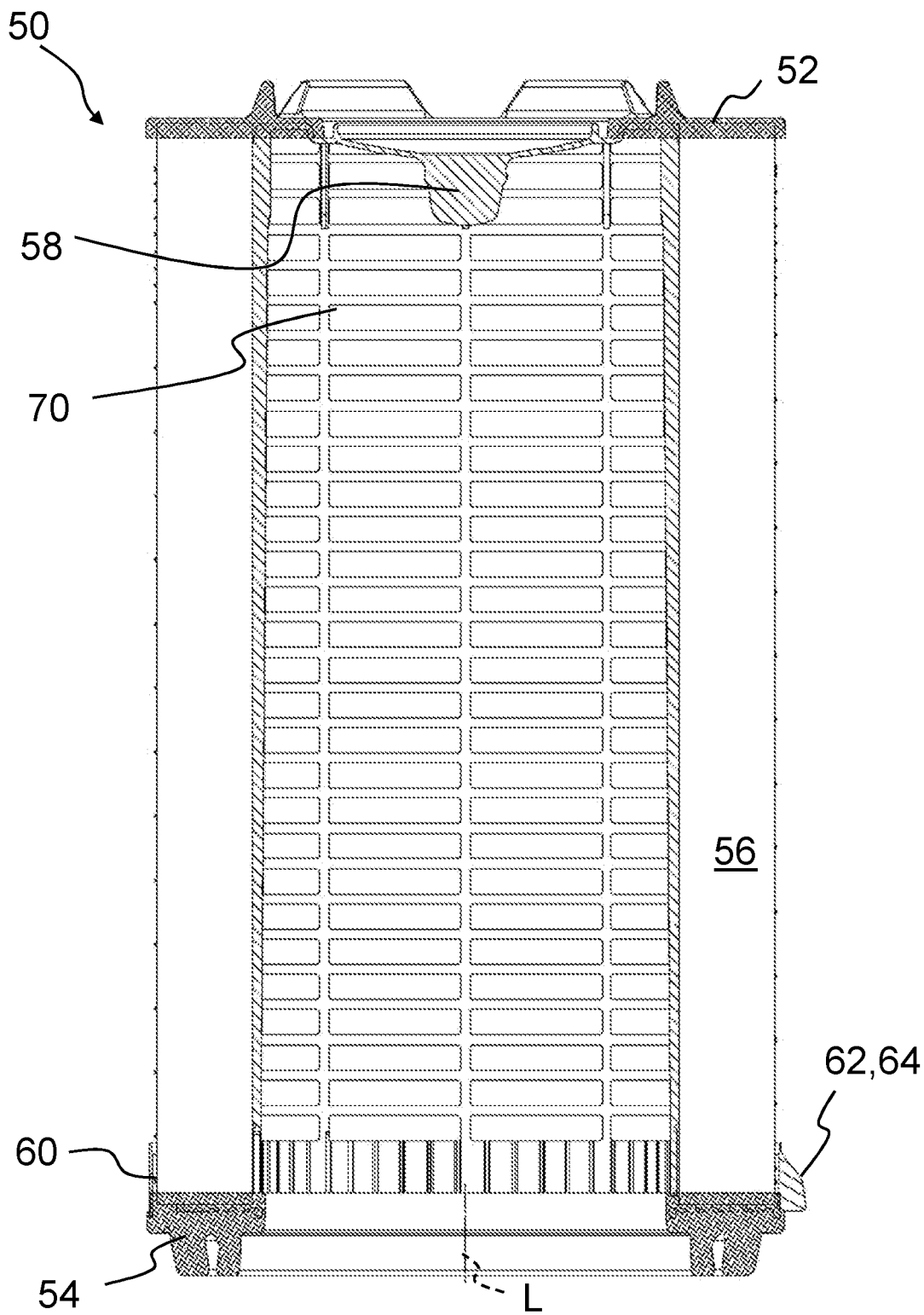
FIG. 8 shows a primary filter element according to an embodiment of the invention comprising a radially extending protrusion at the outer circumference of an end cap.

FIGS. 7 and 8 illustrate a bottom housing wall 120 and a primary filter element 50 which cooperate via self-positioning elements 92 and 62, according to an embodiment of the invention and which can be readily combined with the inventive secondary filter element 10. FIG. 7 shows the housing wall 120 with a rigidly attached stand pipe 150 and FIG. 8 depicts the primary filter element 50 in a side view.

The interior of the stand pipe 150 is in fluid connection with the fluid outlet 108. The stand pipe 150 is surrounded by a self-positioning element 92 being configured as guiding surface 94 having the shape of a ring ramp. The guiding surface 94 is formed as a ramp which has a maximum region with a maximum height in relation to the longitudinal axis L and a minimum region with a minimum height in relation to the longitudinal axis L at the opposite side of the stand pipe 150. A self-positioning element 62 configured as a radially extending protrusion 64 can glide on the guiding surface 94 from the maximum region to the minimum region when the primary filter element 50 and/or the bottom housing wall 120 are rotated about the longitudinal axis L. A notch 96 is arranged in the minimum region in which the radially extending protrusion 64 of the primary filter element 50 can snap into place.

The primary filter element 50 in FIG. 8 comprises a radially extending protrusion 64 at the outer circumference of the second end cap 54. The radially protruding element 64 can be arranged on a ring 60 for accommodating the filter medium 56 of the primary filter element 10 comprising a radially extending protrusion 64 at the outer circumference of its second end cap 54. The primary filter element 50 has a filter body consisting of a filter medium 56 which extends between a first end cap 52 and a second end cap 54 which has a feedthrough for the stand pipe 150 (FIGS. 5 and 6). The filter medium 56 is attached to the outer surface of a support structure 70 arranged in the interior of the primary filter element 50. A self-positioning element 62 configured as a radially extending protrusion 64 is arranged at the second end cap 54. The radially extending protrusion 64 is part of a ring 60 which is embedded in the material of the second end cap 54. The ring 60 is shown in FIG. 8. The ring 60 accommodates the filter body consisting of the filter medium 56 in its interior. The ring 60 has an outer rim which overlaps the bottom part of the filter body in axial direction.

Figure 9:
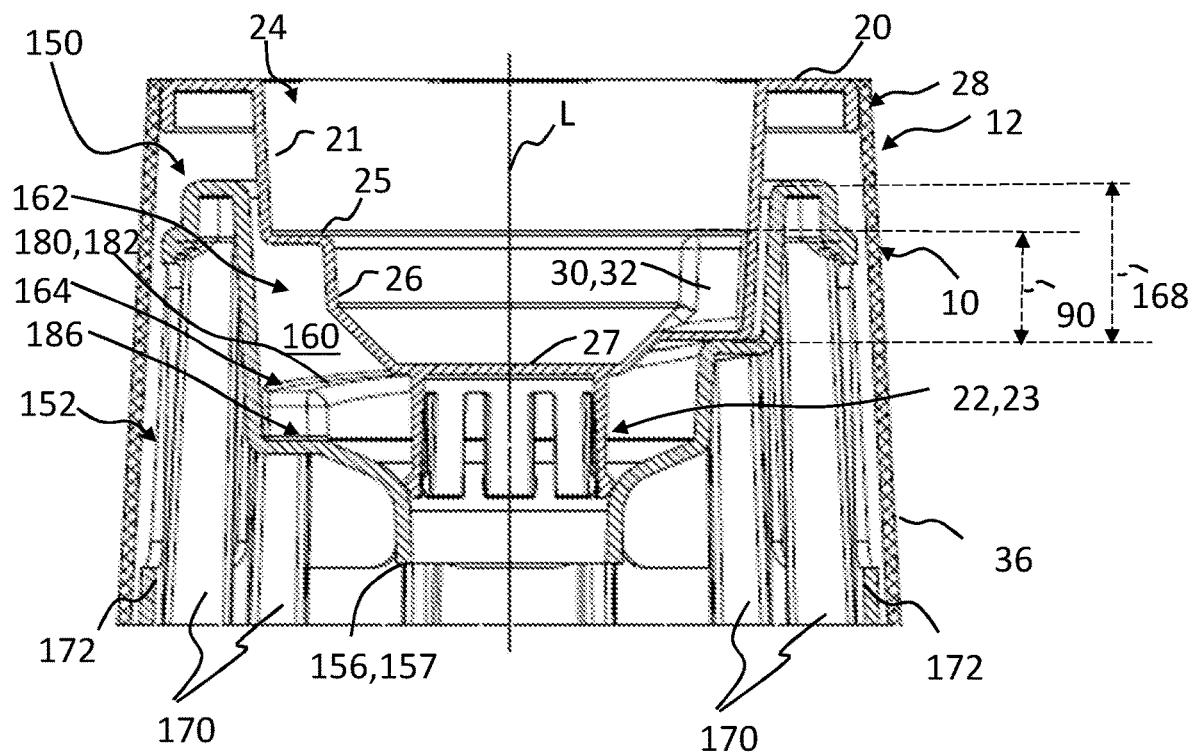
FIG. 9 shows a detailed view of a secondary filter element and a stand pipe making an initial contact during assembly.

FIG. 9 shows a detail of an embodiment of a secondary filter element 10 which is mounted to a stand pipe 150 before the secondary filter element 10 is put in its final position. To mount the secondary filter element 10 onto the stand pipe 150, the body 36 of the secondary filter element 10 is put over and moved along the stand pipe 150 until the end cap 20 comes close the receptacle 160 of the stand pipe 150.

At its upper region 12 the secondary filter element 20 is provided with an end cap 20, the end cap 20 having a recess 24 at its exterior side. The stand pipe 150 in this embodiment comprises a receptacle 160 at its top region 152. The contour of the receptacle 160 corresponds to the exterior contour of the end cap 20 of the secondary filter element 10. The receptacle 160 has an open ended bottom which ends in a connection element 156 for the connection elements 22 of the secondary filter element 10. For instance, snap beams 23 can be hooked on the bottom of the receptacle 160 as locking element and establish a snap fit connection between the stand pipe 150 and the secondary filter element 10. The receptacle 160 is funnel shaped in its bottom region so that introducing the snap beams is facilitated.

The end cap 20 enters the receptacle 160 towards the funnel-shaped bottom region of the receptacle 160 with the snap beams 23 first. The end cap 20 can be introduced into the receptacle 160 until the projection element 32 hits the guiding surface 182. The longitudinal extension 90 of the projection element 32 is smaller than the depth 168 of the top segment 162 of the receptacle 160. Thus, the upper segment 21 of the end cap can be immersed partly into the top segment 162 so that the step 25 is safely inside the receptacle 160. As a result, the end cap 20 can be guided further into the receptacle 160 safely without tilting.

The guiding surface 182 has one maximum point 190 in the bottom segment 164 of the receptacle 160 and is inclined on both sides of the maximum point 190. The maximum point 190 of the guiding surface 182 is at the interface between the top segment 162 and the bottom segment 164 of the receptacle 160. By turning the end cap 20 in either direction about the longitudinal axis L the end cap 20 moves further into the receptacle 160 because the projection element 32 is guided on the guiding surface 182 until the projection element 32 reaches the pocket 186 in the guiding surface 182.

The end cap 20 now is moved axially until the projection element 32 is accommodated in the pocket 186. As the snap beams 23 move axially downward, too, they can snap over the rim of the funnel shaped bottom segment 164. The rim is the locking element 157 of the stand pipe 150. The snap beams 23 lock the end cap 20 safely to the stand pipe 150. The end cap 20 may be removed from the stand pipe 150 by an opposite sequence of movement by pulling and turning the end cap 20.

For turning the end cap 20, a tool such as a handle or the like can be applied to the recess 24 of the end cap 20.

With the projection element 32 accommodated in the pocket 186, the secondary filter element 10 is positioned accurately in a well-defined rotational position with respect to the stand pipe 150. Hence, the longitudinal weld seam (not shown) is in a distinct position with respect to the longitudinal struts 170 of the stand pipe 150 and, consequently, to a mass flow sensor arranged at a fixed position close to the filter elements. Preferably, the hooks at the snap beams 23 are provided with inclined surfaces so that these can come loose when some force is applied to the end cap 20.

The length of the end cap 20 with snap beams 23 is matched to the depth of the receptacle 160 so that the snap beams 23 come into contact with the rim, i.e. the locking element 157, of the funnel shaped end of the receptacle 160 with the projection element 32 reaching its end position in the pocket 186. The step 25 of the end cap 20 rests on the maximum point 190 of the guiding surface 182 in the receptacle 160.

What is claimed is:

1. A filter system (100) comprising a housing (110), a fluid inlet (102) formed in a housing wall (112), a fluid outlet (108) formed in a housing wall (120), a primary filter element (50) and a secondary filter element (10), both being accommodated in the housing (110),
wherein the secondary filter element (10) is arranged downstream the primary filter element (50) on a frustoconical stand pipe (150), the stand pipe (150) being rigidly connected to one of the housing walls (120), the inside of the stand pipe (150) being in fluid connection with the fluid outlet (108),
wherein the secondary filter element (10) comprises a filter medium (16) forming a frustoconical body (36) having at least one longitudinal seam (18) along a longitudinal axis (L), and two axial end regions (12, 14), wherein one end region having a smaller diameter is defined as top region (12), wherein the opposite end region (14) has a larger diameter, and
wherein the filter body (36) of the secondary filter element (10) has a first edge (13) at one axial end region (12) which is curved in an initial, flat, unwound state of the filter medium (16) and, when viewed perpendicular to the longitudinal axis (L), straight in a final wound state of the filter medium (16) forming the filter body (36), and a second edge (15) at the opposite axial end region (14) of the filter body (36), which is straight in an initial, flat, unwound state of the filter medium (16) and curved when viewed perpendicular to the longitudinal axis (L) in a final wound state of the filter medium (16) forming the filter body (36).

2. The filter system according to claim 1, wherein a sealing structure (127) is arranged at the stand pipe (150) the contour (121) of which being complementary to the contour of the second edge (15) of the secondary filter element (10).

3. The filter system according to claim 2, wherein the sealing structure (127) comprises a pocket (122) for accommodating the secondary filter element (10), the pocket (121) having a bottom (124) following the contour (121) of the sealing structure (127).

4. The filter system according to claim 3, wherein the contour (121) of the sealing structure (127) comprises a maximum point (123) and a minimum point (125), wherein a height (H125) of the minimum point (125) is lower than a depth (124) of the pocket (122) at the maximum point (123) in relation to the longitudinal axis (L), preferably wherein a height (H125) of the minimum point (125) has a shorter extension along the longitudinal axis (L) measured from a base line (129) than an extension along the longitudinal axis (L) from the base line (129) to the bottom (124) of the pocket (122) at the maximum point (123).

5. The filter system according to claim 1, wherein the region (14) of the secondary filter element (10) with the second edge (15) of the filter body (36) is arranged close to an interface between the one of the housing walls (120) and the stand pipe (150).

6. The filter system according to claim 1, wherein the secondary filter element (10) comprises an end cap (20) at its top region (12) and wherein the secondary filter element (10) and the stand pipe (150) are mutually connected at one of their top regions (12, 152) by connection elements (22, 156).

7. The filter system according to claim 1, wherein the primary filter element (50) and the one of the housing walls (120) accommodating the stand pipe (150) and the bottom portion (55) of the primary filter element (50) are configured with mutual self-positioning elements (92, 62) to arrange the primary filter element (50) on the one of the housing walls (120) accommodating the stand pipe (150) in a defined rotational position with respect to one or more struts (170) of the stand pipe (150), wherein the mutual self-positioning elements (92, 62) comprise a radially extending protrusion (64) and a guiding surface (94), the radially extending protrusion (64) being configured to glide along the guiding surface (94) on a relative rotational movement of the primary filter element (50) and the one of the housing wall (120) about a common rotational axis.

8. The filter system according to claim 7, wherein the radially extending protrusion (64) is arranged on the outside of an open end cap (55) of the primary filter element (50) and the guiding surface (94) is provided on the inside of the one of the housing walls (120), surrounding the stand pipe (150), and/or wherein the guiding surface (94) includes a notch (96) accommodating the radially extending protrusion (62) in its locked position.

9. The filter system according to claim 1, wherein the secondary filter element (10) and the stand pipe (150) are configured with mutual self-positioning elements (30, 180) to align the secondary filter element (10) on the stand pipe (150) in a defined rotational position with respect to one or more struts (170) of the stand pipe (150).

10. The filter system according to claim 9, wherein the mutual self-positioning elements (30, 180) of the secondary filter element (10) and the stand pipe (150) comprise a guiding surface (182) and a projection element (32), wherein the guiding surface (182) is configured to guide the projection element (32) from an initial position to a final position where the secondary filter element (10) is in its defined rotational position with respect to the one or more struts (170) of the stand pipe (150), and/or wherein the mutual self-positioning elements (30, 180) comprise a contour arranged at an exterior surface of one of the stand pipe (150) and the secondary filter element (10) and a counter contour at an interior surface of the other one of the stand pipe (150) and the secondary filter element (10).

11. A secondary filter element (10) of a filter system (100) according to claim 1, comprising a filter medium (16) forming a frustoconical body (36) with at least one longitudinal seam (18), in particular weld seam (18), along a longitudinal axis (L), two axial end regions (12, 14), wherein one end region having a smaller diameter is defined as top region (12), wherein the opposite end region (14) has a larger diameter, and an end cap (20) at its top region (12), wherein the filter body (36) has a first edge (13) at the top region (12) which is curved in an initial, flat, unwound state of the filter medium (16) and, when viewed perpendicular to the longitudinal axis (L), straight in a final wound state of the filter medium (16) forming the filter body (36) and a second edge (15) at the opposite end region (14) of the filter body (36) which is straight in an initial, flat, unwound state of the filter medium (16) and curved, when viewed perpendicular to the longitudinal axis (L), in a final wound state of the filter medium (16) forming the filter body (36).

12. The secondary filter element according to claim 11, wherein the end cap (20) is provided with one or more connection elements (22) which are configured to connect the secondary filter element (10) to a stand pipe (150) of the filter system (100), and/or
wherein the end cap (20) is provided with a self-positioning element (30) to arrange and align the secondary filter element (10) on the stand pipe (150) of the filter system (100) in a defined rotational position with respect to one or more struts (170) of the stand pipe (150) of the filter system (100).

13. The secondary filter element according to anyone of claim 11, wherein the end cap (20) has a pot-like shape and the self-positioning element (30) extends into the interior of the secondary filter medium (16).

14. The secondary filter element according to claim 13, wherein the end cap (20) is provided with a projection element (32) extending in axial direction (L).

15. A method of manufacturing a secondary filter element (10) for an air filter system of claim 1, comprising the steps of:
providing a cut of filter medium (16), the cut of the filter medium having a modified trapezoidal shape based on an isosceles trapezoid having a center line of symmetry, two parallel bases and two oblique legs or sides, wherein the longer base defines a straight edge (15) and wherein the shorter base is modified by cutting a segment off the trapezoid at the shorter base creating a curved, concave edge.

16. The method according to claim 15, further comprising cutting a circle segment is off the trapezoid at the shorter base, the circle having a center on the center line of symmetry of the trapezoid and the circle line intersecting the shorter base at both ends, creating a concave cut line defining a first curved, especially concave edge (13).

17. The method according to claim 15 further comprising:
creating a frustoconical filter body (36) by connecting the legs or sides of the cut,
wherein the connecting of the legs or sides is performed by forming a seam to connect the legs or sides, the seam formed by:
at least one of: gluing, welding or sewing.

18. The method according to claim 17, further comprising:
providing at least one end cap (20) on at least one axial end region (12, 14) of the frustoconical filter body (36).

* * * * *